Nov. 8, 1966  K. M. BOWYER  3,284,737
SPRING-ADJUSTABLE, THERMALLY RESPONSIVE
SWITCH UTILIZING A FIRST-ORDER
TRANSITION MATERIAL
Filed May 12, 1964  3 Sheets-Sheet 1
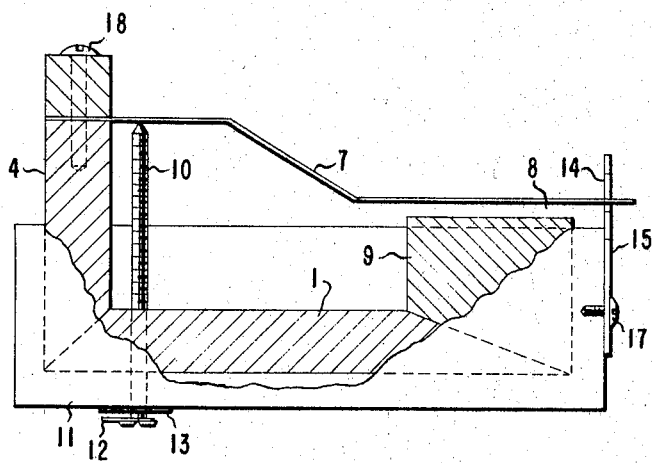
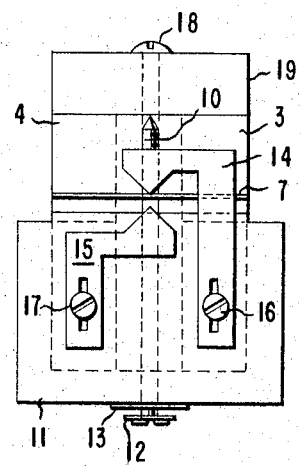
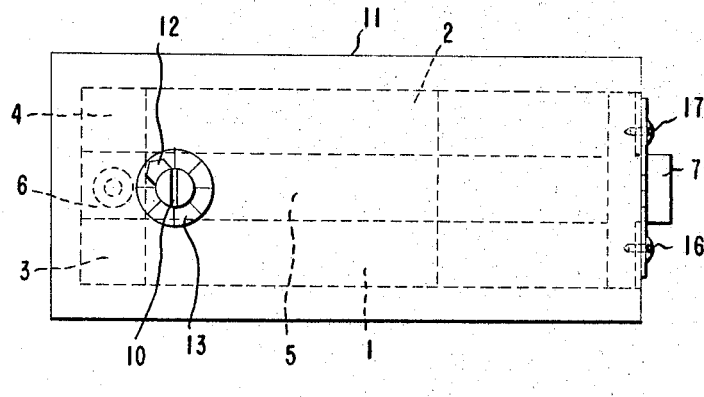
*INVENTOR*
KERN M. BOWYER
BY *Gary O. Samuels*
*ATTORNEY*

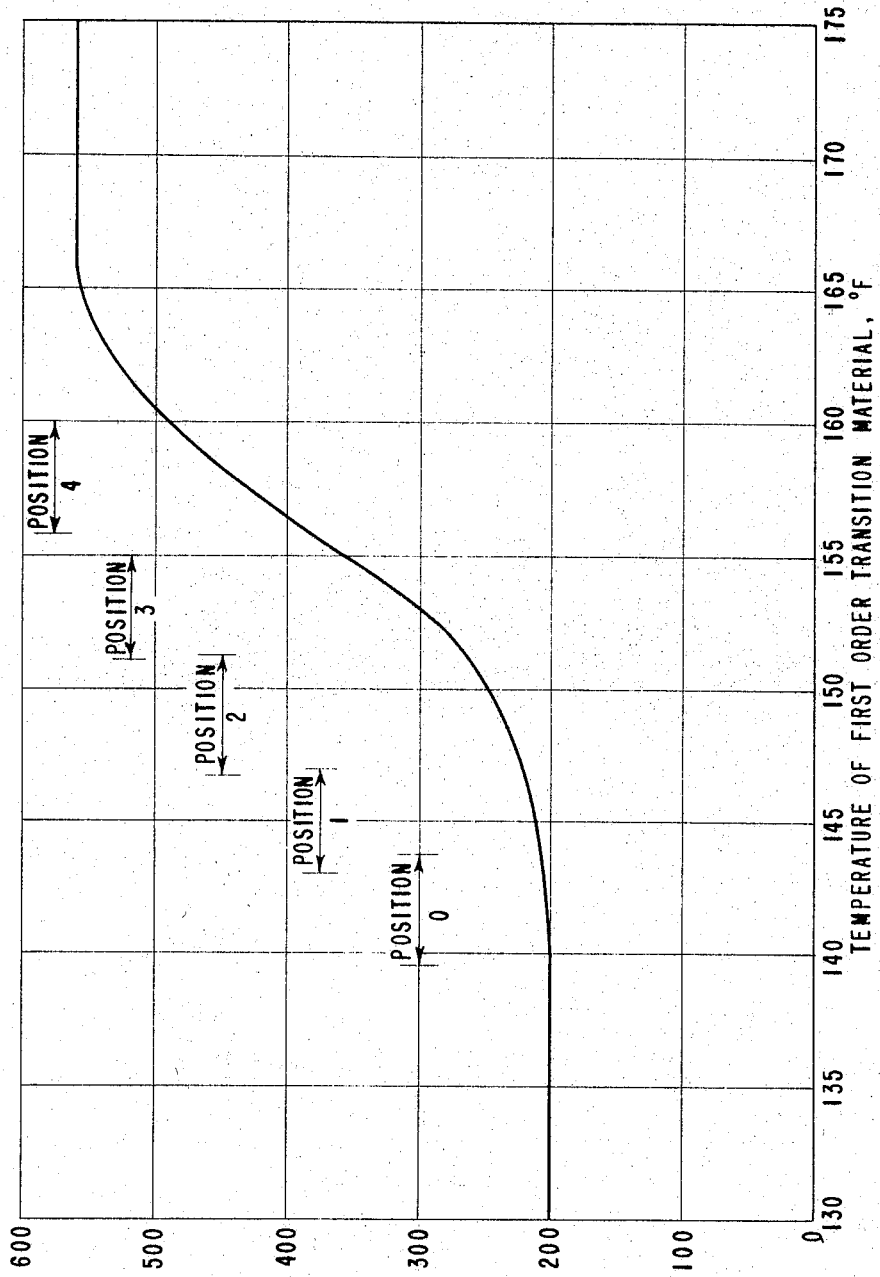

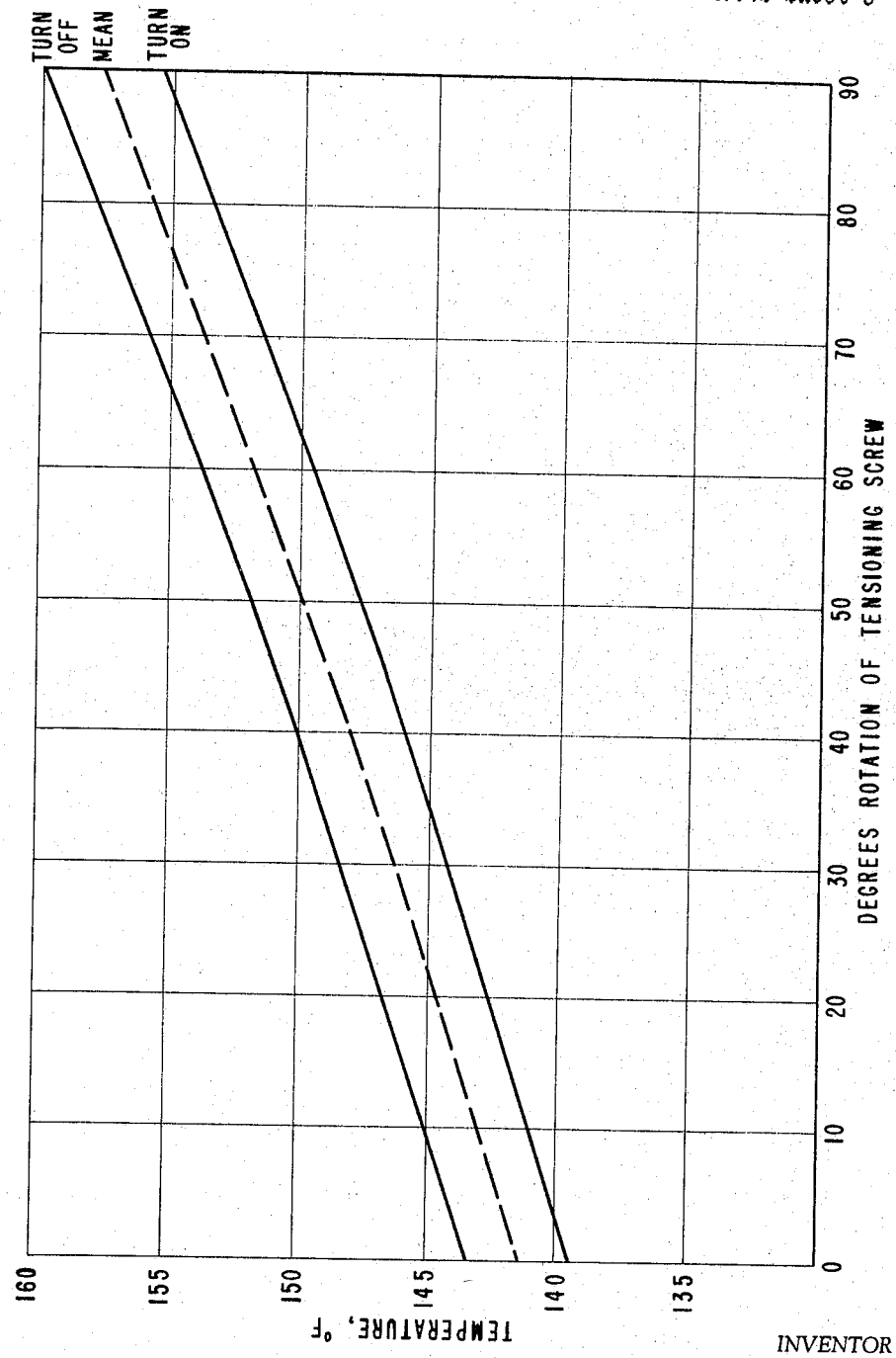

United States Patent Office 3,284,737
Patented Nov. 8, 1966

1

3,284,737
SPRING-ADJUSTABLE, THERMALLY RESPONSIVE SWITCH UTILIZING A FIRST-ORDER TRANSITION MATERIAL
Kern M. Bowyer, Wilmington, Del., assignor to E. I. du Pont de Nemours and Company, Wilmington, Del., a corporation of Delaware
Filed May 12, 1964, Ser. No. 366,831
4 Claims. (Cl. 335—146)

This invention relates to a temperature control device. More particularly, it relates to an adjustable temperature control device for controlling the temperature of an environment by controlling the electric current to a heating or cooling unit for heating or cooling the environment.

Such adjustable temperature control devices or thermostats are employed in diverse fields of modern technology, e.g., to control the circulation of cooling medium in internal combustion engines, to regulate the temperature of water in boilers and hot-water storage systems, and to control the temperature of living quarters, assembly halls, and the like. In most of these devices a bi-metallic element is conventionally employed as a temperature responsive component which effects the opening or closing of contacts to the heating or cooling unit by deflection of the bi-metallic element. In these devices, a small, permanent magnet is sometimes incorporated to stabilize operation, for in the absence of such a magnet, the slow deflection of the bi-metallic element causes arcing as the contacts open or close. The magnet is used to produce rapid opening or closing of the contacts during the last stages of deflection. However, the operation of the bi-metallic temperature responsive component is not dependent upon the presence of a magnet.

Another type of temperature control device, or thermally operated switch, that has been described comprises a magnet and a magnetic first-order transition material, sometimes referred to as a magnetic exchange inversion material. In this device, the transition material is so positioned that when it reaches its transition temperature, i.e., the temperature at which it becomes ferrimagnetic, it is attracted to a permanent magnet and in so doing, electrical contacts on the switch are moved so that the electric circuit to the heating or cooling unit being controlled is opened or closed, respectively. Such a device is described in U.S. Patent 3,126,492 to T. J. Swoboda. The temperature at which the first-order transition takes place in the transition material is dependent on the chemical composition of the material, thus a desired operating temperature of the switch can be obtained only by appropriately selecting the composition of the transition material.

More recently, U.S. application Ser. No. 298,299, filed July 29, 1963, by W. M. Flook, Jr., and P. A. Vance, Jr., assigned to applicant's assignee, describes an adjustable temperature responsive control device which involves the use of a matched set of temperature responsive elements composed of materials that undergo a magnetic first-order transition at different temperature levels. These materials are arranged in a sequential order of transition temperatures and this arrangement permits adjustment of the device for controlling an electric current to a heating or cooling unit at a predetermined temperature.

It is an object of this invention to provide a thermally operated switch containing a magnetic first-order transition material which does not require a sequential series of different such materials to obtain a different operating temperature over a limited temperature range. It is another object to provide such a switch which does not require the changing of the chemical composition of the magnetic first-order transition material in the switch to obtain a different operating temperature over a limited

2 temperature range. These and other objects will become apparent hereinafter.

The device of this invention is, in general, a spring adjustable control device for controlling the temperature of an environment by controlling the electric current to a heat-transfer unit, i.e., a heating or cooling unit, which comprises (a) magnetic means, (b) a magnetic first-order transition material, (c) electrical switch operating means, and (d) variable tension means for varying the ease of movement of the switch operating means.

Alternatively, the device of this invention may be defined as comprising (a) a magnetic circuit including a permanent magnet, a ferromagnetic spring arm and a block of a material that undergoes a first-order transition as defined below over a relatively broad transition range, with an air gap between the spring arm and the transition material, (b) a means for providing variable tension to the spring arm, and (c) a set of electrical contacts positioned on opposite sides of the spring arm near the block of transition material and that are opened and closed by movement of the spring arm and which limit the extent of motion of the spring arm.

The magnetic first-order transition material employed in the temperature control device of this invention is one which undergoes a first-order solid-phase-to-solid-phase transition within a limited temperature range below its Curie point accompanied by a sharp and reversible change in its magnetic saturation induction, and will be referred to hereinafter simuly as "first-order transition material."

The invention will be best understood from the following description of specific embodiments when read in connection with the accompanying drawings, in which FIG. I is a side view, partly in section of one embodiment of the device of this invention;

FIG. II is an end view of the device of FIG. I;

FIG. III is a bottom view of the device of FIGS. II and III;

FIG. IV is a graph showing the relationship of the magnetic field in the air gap in the device of FIGS. I–III to the temperature of the device, and FIG. V is a graph showing operating characteristics of a switch made according to FIGS. I–III.

Referring now to the embodiment illustrated by FIGS. I–III, the device comprises a magnetic circuit made up of permanent bar magnets 1, 2, 3, and 4 laminated to both sides of brass bars 5 and 6, a spring steel arm 7, an air gap 8 between the spring steel arm and a block of first-order transition material 9, which is in turn adjacent to the ends of magnets 1 and 2 and brass bar 5. In addition, a screw 10 is threaded through the brass bar 5 to provide means for varying the tension on spring arm 7. The lower part of the assembly of magnets, brass bar and first-order transition material is encased in a layer 11 of a solid synthetic resin or other solid, non-magnetic, electrically insulating material. A pointer 12 attached to the head of screw 10 and a graduated dial 13 attached to the base of the device provide means for reproducing desired tension on the spring arm 7. The graduations on this dial can be in degrees of temperature or simply of uniform circular degrees. A pair of electrical contacts 14 and 15 are mounted on the end of the device to provide electrical contacts with the spring arm 7 so as to open or close the electric circuit being controlled by the device. The electric circuit is completed through either terminal 14 or 15 with terminal 18 at the opposite end of the spring arm 7. Contacts 14 and 15 also serve as limits of motion of spring arm 7 and they can be raised or lowered by means of adjusting screws 16 and 17 to provide the desired amount of spring arm movement during operation of the device. The contacts 14 and 15 can be made of various electrically conducting, non-magnetic materials, e.g., aluminum, brass, copper, etc.

The device of this invention operates as a thermostat as follows: The first-order transition material selected for block 9 is one having a broad transition range, i.e., the transition from the antiferromagnetic to the ferrimagnetic state takes place over a relatively large range of temperature. The transition range should cover the range of temperatures over which the device is to be operated. As the temperature of the first-order transition material increases to the point where the material starts to transform (i.e., go through its first-order transition point), the magnetic flux across the air gap increases as does the attractive force on the spring arm 7. When the spring arm tensioning screw 10 is adjusted so that the restoring force on the spring arm 7 is small, the magnetic force of attraction required to move the spring arm and operate the device will be reached at a lower temperature than when the spring arm restoring force is set to a higher value. Thus, the spring arm tensioning screw 10 acts as a variable control for the thermostat's operation at temperatures within the transition range of the first-order transition material 9.

The thermostat illustrated by FIGS. I–III can be used to control electric circuits that are either open or closed at temperatures below the temperature at which the device is set to operate. For example, when it is desired to use the thermostat for closing an electric circuit when the temperature increases to the desired point electric contact 15 is employed in combination with terminal 18. When the thermostat is at a temperature below the set point, spring arm 7 rests against upper contact 14 (which, in this case, is not connected to an electric circuit). As the temperature of the thermostat increases through the transition range of the first-order transition material in block 9, the transition material transforms from antiferromagnetic to ferrimagnetic or ferromagnetic and when the magnetic field passing through block 9 reaches the strength necessary to attract the spring arm with a force which overcomes the tension on spring arm 7, the arm is pulled down to the lower contact 15 which then closes the electric circuit. On the other hand, when it is desired to maintain a closed electric circuit at temperatures below the set point of the thermostat, upper contact 14 is used in conjunction with terminal 18. In this case, the circuit is opened when the temperature of the thermostat reaches the point where the transition material (block 9) is sufficiently ferromagnetic to pull the spring arm 7 away from contact 14.

The thermostat can also be used to control both heating and cooling units simultaneously. For example, contact 14 can be connected to the electric circuit to a heating unit and contact 15 can be connected to an electric circuit to a cooling unit. Thus, the thermostat will turn the heating unit on at temperatures below the set point of the thermostat and turn the cooling unit on at temperatures above the set point.

A thermostat constructed according to the design shown in FIGS. I–III used a chromium-modified manganese antimonide as the first-order transition material. The particular antimonide employed had the composition $Mn_{1.8699}Cr_{0.1300}Sb_{0.9500}In_{0.0500}Al_{0.0057}$, and was prepared by slowly cooling a melt of this composition at a rate of 7° C. per hour to 660° C. and then cooling at 40° C. per hour to room temperature. The magnets 1 and 2 were ¼" square and of 2" over-all length with one end cut at an angle of 45° and the other at approximately 20°, and were composed of the alloy known commercially as "Alnico" V–B (8% Al, 14% Ni, 24% Co, 3% Cu, and the balance Fe). The magnets 3 and 4 were composed of the same alloy as magnets 1 and 2 and were ¼" square and of 15/16" over-all length with the lower ends cut at an angle of 45° and the top at 90°. Bars 5 and 6 were made of brass and were of the same dimensions as magnets 1, 2 and 3, 4, respectively. Spring arm 7 was constructed from spring steel ¾" x 2½" x 0.009" (before bending to shape) and held in place on the ends of magnets 3 and 4 and bar 6 by means of mounting block 19 made of brass ¼" x ¼" x ¾" and a No. 6–32 round head brass machine screw 18 which was ½" long. This screw 18 also served as the terminal for one side of the electric circuit being controlled. The antimonide block 9 was ⅝" x ¾" in cross-section and of 19/32" maximum height with the bottom cut at an angle of approximately 70°. The tensioning screw 10 was a No. 4–40 round head brass screw 1⅛" long threaded through the brass bar 5, and had its upper end tapered to a point. The enclosure 11 was made by surrounding the magnets, brass bars and antimonide to the extent shown in the figures by a fast setting resin composition. The pointer 12 was made of brass and was soldered to the head of tensioning screw 10. The scale 13 was a circle of paper cemented onto the surface of the enclosing case 11. This paper circle was marked into uniform angular divisions. The electrical contacts 14 and 15 were made from aluminum 0.02" thick and served also as mechanical motion limits for spring arm 7. The contacts 14 and 15 were mounted on the end of the container 11 by means of round head brass machine screws No. 2–56 of ⅛" length. The lower contact 15 was adjusted to provide approximately 0.005" spacing between the arm 7 and antimonide block 9, when the switch is closed, i.e., when the spring is pulled down on contact 15. The upper contact 14 was adjusted to provide a total motion of 0.020" by the spring arm between the two contacts.

The operating characteristics of the thermostat described above are shown in FIGS. IV and V. In FIG. IV the field strength, in gauss, in the air gap 8 between the spring arm 7 and the antimonide block 9 is plotted against the temperature of the anti-monide block. In making the test, the thermostat is heated in an oven well above its operating range and the thermostat is then removed from the oven and allowed to cool. The probe from a commercial gauss meter is inserted in the air gap with the spring arm biased closed so that the gap spacing does not vary. The temperature of the antimonide block is measured by a thermocouple placed near the center of the block. Also plotted on the curve in FIG. IV are the temperature ranges over which the spring arm 7 moves between contacts 14 and 15 at different settings of the tensioning screw 10. These settings correspond to rotation of the tensioning screw 10 through successive 22½° increments.

FIG. V shows the controlled air temperature at various settings of the tensioning screw 10, when the rate of change of temperature $dT/dt$, is 5.4° F. per hour. From this curve it is evident that the control setting of the thermostat is essentially linear with the setting of the pointer attached to the tensioning screw.

The drawings of FIGS. I–III illustrate the thermostat of this invention using a screw as the means for varying the tension on the spring arm. However, other tensioning means can also be employed. For example, a cam can be used to vary the tension on the spring arm.

Similarly, the thermostat of this invention is not limited to the use of creep action contacts as illustrated by FIGS. I–III. The motion in the end of spring arm 7 of the thermostat can also be used to operate a precision snap action switch or to tilt a mercury switch to make and break the electrical circuit to the heat exchange units being controlled.

First-order transition materials that are useful in the device of this invention can be defined as materials that undergo a sharp and reversible change in magnetization properties, e.g., a sharp and reversible increase in saturation induction, within a narrow temperature range, at a temperature below the Curie point of the material. The temperature at which this increase occurs is often referred to as the lower ferromagnetic transition temperature to distinguish from the upper transition temperature or Curie point. The unusual dependence of magnetization on temperature at the lower transition temperature is believed to result from a transition from antiferromagnetic to a ferrimagnetic state. Thus, at the transition temperature, the total quantum mechanical exchange between adjacent sublattices is believed to change sign and it is this exchange inversion which is presumed to be at the basis of the observed change in magnetic properties. The transition is a first-order solid-phase-to-solid-phase transition with maintenance of crystal symmetry and any magnetic material having such a transition is useful according to this invention.

A first-order transition, also known as a transition of the first kind, is one in which a discontinuity occurs in the first derivatives of the Gibbs free energy. For example, there are discontinuities in the first derivative with respect to temperature, i.e., entropy, with respect to pressure, i.e., in volume, and for a magnetic material with respect to magnetic field, i.e., in magnetization.

A second-order transition is one in which the second derivative of the free energy is discontinuous but the first derivative is continuous. In other words, at a second-order transition energy, volume, and in a magnetic substance magnetization change continuously but the temperature derivatives of these quantities have singularities. The Curie point in a magnetic material is an example of a second-order transition.

Further discussion of first- and second-order transitions is found in Swalin, "Thermodynamics of Solids," John Wiley & Sons, Inc., New York, 1962, pp. 72–73, and in "Phase Transformation in Solids" (symposium at Cornell University, August 23–28, 1948), John Wiley & Sons, Inc., New York, 1951, chap. I, by L. Tisza, pp. 1–2.

Among compositions useful as magnetic first-order transition materials in the device of this invention are compositions as more fully described in U.S. Patent 3,126,347 to T. J. Swoboda, which contain (a) at least two transition elements selected from Groups V–B, VI–B, and VII–B of the Periodic Table, i.e., V, Cr, Mn, Nb, Mo, Ta, W, and Re, of which at least one is taken from the first row of said transition elements, i.e., V, Cr, and Mn, and (b) at least one element of Group V–A selected from As and Sb, and which constitutes 5–40 atom percent of the whole and preferably 5–35 atom percent. Nitrogen, phosporus and bismuth may also be present. The compositions may contain other elements from Groups II–IV of the Periodic Table in an amount not more than 30 atom percent. Such elements include cadmium, gallium, indium, lead, thallium, tin, zirconium, scandium, yttrium, magnesium, and zinc. Ordinarily one of the transition metals enumerated above will constitute the major proportion of the transition metal content of the composition while the second transition metal will be present in minor proportion. However, in no case will the content of the second transition metal be less than 0.1 atom percent based on the total composition.

The Periodic Table referred to herein is the one appearing in Deming's "General Chemistry," John Wiley & Sons, Inc., 5th ed., chap. 11.

Iron-rhodium alloys (Fe-Rh) and iron-rhodium alloys containing up to 20 atom percent of at least one other element (Re-Rh-M) are also useful as first-order transition materials in the device of this invention. Suitable Fe-Rh alloys include those described by Fallot, "Revue Scientifique," 77, 498 (1939); Kouvel et al., "General Electric Research Report No. 61–RL–2870M." Suitable Fe-Rh-M alloys are described in copending U.S. applications Serial Nos. 177,229 and 177,230, filed March 5, 1962, by P. H. L. Walter; application Serial No. 192,060, filed May 3, 1962, by P. H. L. Walter; and application Serial No. 192,059, filed May 3, 1962, by T. A. Bither. These magnetic compositions consist essentially of iron and rhodium in major proportion and at least one other metal in minor amount. The at-least-one-other metal which also must always be present, will range in amount from 0.01–0.20 atom proportions. These new magnetic compositions may be represented by the formula $Fe_aRh_b[xM]_c$, wherein M represents (1) at least one element selected from beryllium, magnesium, aluminum, gallium, indium, silicon, germanium, tin, lead, phosphorus, arsenic, antimony, bismuth, sulfur, selenium, and tellurium, and $x$ is an integer from 1–6 and generally 1–2; (2) at least one transition metal of atomic number 39–44, 46–48, and 57–80, inclusive, and $x$ is an integer from 1–6 and generally from 1–2; (3) at least one transition metal of atomic number 21–25 and 27–30, inclusive, and $x$ is an integer from 1–6 and generally 1–2; or (4) at least one rare earth metal of the lanthanum or lanthanide series of the Periodic Table of the elements of atomic number 57–71, inclusive, and $x$ is an integer from 1–14, and generally 1–3. In all these iron-rhodium-metal compositions, $a$ and $b$, which can be alike or different, are numbers ranging from 0.8 to 1.2, and $c$ is a number ranging from 0.01 to 0.20 and in the instance when $x$ is 2, the requisite number of $c$'s can be alike or different, but still must fall in the indicated range. These subscript numbers refer to the atomic proportions of the elements in the final alloy. M can be different within the same defined group when $x$ is greater than 1.

Further compositions which can be employed as the first-order transition materials in the devices of this invention are those having a tetragonal crystal structure and containing manganese in an amount of at least 40 atom percent, a second metallic component selected from iron, cobalt, nickel, copper, and zinc, in an amount of 0.6 to 25 atom percent and at least one of arsenic, antibony and bismuth in an amount of 25 to 40 atom percent. Additional components selected from the elements of Groups III–A, III–B, IV–A, IV–B, nitrogen, and phosphorus, in an amount of 0 to 25 atom percent may also be present. These compositions are described more fully in U.S. Patent 3,126,345 to T. J. Swoboda.

Still other compositions useful in the present invention are described in U.S. Patent 3,126,346 to T. A. Bither. These compositions have a tetragonal crystal structure and contain a single transition metal selected from chromium, manganese, iron, cobalt, or nickel in an amount of 61 to 75 atom percent, and from 25 to 39 atom percent of at least two elements selected from gallium, germanium, selenium, tellurium, arsenic, antimony and bismuth, of which at least the major atom percent consists of arsenic antimony, and/or bismuth.

Other useful compositions are represented by the formula $Mn_{2-x-y}T'_xT''_ySb_zIn_a$, where T' is chromium and/or vanadium, T'' is one or more of iron, cobalt, nickel and copper, $x$ is 0.003 to 0.25, $y$ is 0.003 to 0.25, $z$ is 0.50 to 1.00, and $a$ is 0 to 0.50. These compositions are more fully described in application Serial No. 261,784, of W. W. Gilbert and T. J. Swoboda, filed February 28, 1963.

Processes for preparing compositions useful as the magnetic first-order transition materials in the device of this invention are described in the foregoing applications and in application Serial No. 120,679, of W. W. Gilbert, filed June 29, 1961.

As indicated previously, the first-order transition of the materials used in the thermostat of this invention preferably occurs over a relatively wide temperature interval sufficient to allow control to be varied over a definite, relatively wide temperature range. If very close control within a much narrower temperature range is desired, it is advantageous to use a first-order transition material whose transition occurs over as narrow a temperature interval as possible bracketing the desired control range. The temperature range over which the transition occurs is of course affected by changes in the composition of the first-order transition material and by its method of preparation and can be adjusted to provide a thermostat that operates over the desired temperature range. Oriented magnetic first-order transition materials, such as single crystals oriented along the direction of easy magnetization, which in the case of the chromium manganese antimonides at temperatures between −30 and +80° C. is in the direction of their c-axis, are especially useful in the thermostat of this invention. Such oriented materials have a somewhat broader transition range than poly-crystalline materials, but the permeability of the oriented crystals (defined as $B/H$, where B is the magnetic induction of the material and H is the magnetic field strength) is three times or more greater than the permeability of polycrystalline materials, and consequently produce more reliable theromstats.

When any of the above-described compositions useful in the device of this invention contain antimony, they are referred to as an "antimonide." In a typical polycrystalline antimonide, the change from the non-magnetic to the magnetic state and vice versa takes place over a total temperature interval of about 3–20° C. or more and is a linear function of the temperature over approximately the central 80% of this temperature range. In single crystals of antimonide, the transition occurs over approximately a 7–20° C. range. For convenience, the mid-point of the range is usually referred to as the temperature, $T_s$, at which the change between magnetic and non-magnetic states occurs. However, the temperature at which the spring arm in the device of this invention is moved toward the first-order transition material in its magnetic state will not necessarily coincide with this mid-point temperature, but will depend, among other things, on the distance between the spring arm and the first-order transition material, the flexibility of the spring arm, and particularly the amount of tension applied to the spring arm by the variable tension means.

The permanent magnets used in the device of this invention can be made of any composition that is permanently magnetic at the maximum temperature intended for use of the thermostat. Iron alloys, such as alloys containing aluminum (8–10%), cobalt (12.5–24%), copper (3–6%), nickel (13.5–17%), and the balance iron, are entirely suitable. Other suitable materials are well known in the art—see, for example, Bozorth, "Magnetic Materials" (D. Van Nostrand Co., Inc., New York, 1951), especially chap. 9. In addition to the aluminum-cobalt-iron-nickel alloys referred to above, satisfactory results are obtained with magnet steels, such as an alloy containing 36% Co, 7% W, 3.5% Cr, 0.9% C, balance Fe; as well as aluminum-iron-nickel and cobalt-iron-vanadium alloys. Oxide compositions such as the ferrites, e.g., barium ferrite, are also suitable. Useful magnets can also be fabricated from acicular iron, iron-cobalt, or iron-nickel particles.

The magnets can be formed by conventional melt-casting or sintering techniques and may be heat-treated in known manner to develop desired properties. Magnets may also be formed by dispersing particles of a magnet composition in a binder such as a polymer composition, e.g., a polyvinyl chloride composition, forming the dispersion in the desired shape and hardening by evaporation of solvent, if solvent be present, or by cooling if a heat-softened composition has been used.

The material used to enclose the magnets and antimonide blocks in the thermostat can be any material having sufficent strength to keep the elements in proper position and to protect them from external forces that might damage them. If the enclosing material is not an electrical insulator, i.e., a non-conductor for electricity, care must be taken to insulate the terminals from the body of the thermostat.

The spring arm in the device of this invention has been described by specific reference to a spring steel arm of one particular shape. However, spring arms made of other electrically conducting ferromagnetic metals or alloys having sufficient rigidity and elasticity to permit the proper amount of tension to be applied to them for operation by the magnets in the thermostat can be used. Examples of other metals for construction of the spring arm include cobalt, nickel, and silicon-iron alloy.

The contact end of the spring arm and the two limit contacts on the end of the thermostat are preferably coated with a conventional contact material at the points where electrical contact is made. Examples of materials that can be used for these contact points include gold-silver-platinum (69–25–6) alloy, silver-palladium (50–50) alloys, and silver-gold (90–10) alloys. However, various contact materials containing higher proportions of silver, up to and including 100% silver, can be used in some cases. These contacts are attached to the spring arm and to the limit contacts by conventional means, e.g., by plating, soldering, welding or riveting.

The dimensions of the components of the thermostat of this invention can vary widely. The position and shape of the magnet and antimonide blocks in the device can also be varied provided that the essential requirements that a block of a magnetic first-order transition material is placed in a magnetic circuit formed by permanent magnet and a spring arm, with an air gap in the circuit, are met. The particular first-order magnetic transition material, magnet, and spring arm are selected so as to provide a magnetic field of sufficient strength to produce motion of the spring arm between the contact points while raising or lowering the temperature of the transition material through its transition range.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A spring-adjustable temperature control device for controlling the temperature of an environment comprising
    (a) an electrically conducting ferromagnetic switch means;
    (b) magnetic means electrically insulated from said switch means;
    (c) a magnetic first-order transition material which undergoes a first-order solid-phase-to-solid-phase transition from a magnetic state to non-magnetic state over a temperature range of about 3 to 20° C. and with a sharp and reversible change in its magnetic saturation induction, said temperature range being below the Curie point of said material, and said material being electrically insulated from said switch means;
    (d) said magnetic means and said material arranged to direct magnetic flux toward said switch means only when said material is in said magnetic state; and
    (e) variable tension means for varying the ease of movement of said switch means.

2. The device of claim 1 wherein said switch means comprises a spring arm.

3. The device of claim 2 wherein said magnetic means comprises at least one permanent magnet.

4. The device of claim 3 wherein said variable tension means comprises an adjustable screw abutting said spring arm.

References Cited by the Examiner

UNITED STATES PATENTS 2,282,833   5/1942   Stimson _____ 200—88 X

BERNARD A. GILHEANY, *Primary Examiner.*

R. N. ENVALL, Jr., *Assistant Examiner.*